Feb. 4, 1947.　　　P. J. KONKLE　　　2,415,390

INTERMITTENT MOTION DEVICE

Filed Sept. 30, 1941　　　2 Sheets-Sheet 1

INVENTOR.
PHILIP J. KONKLE
BY
ATTORNEY.

Feb. 4, 1947. P. J. KONKLE 2,415,390
INTERMITTENT MOTION DEVICE
Filed Sept. 30, 1941 2 Sheets-Sheet 2
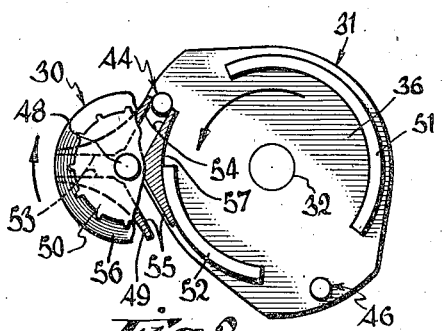
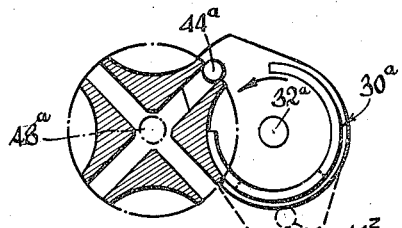
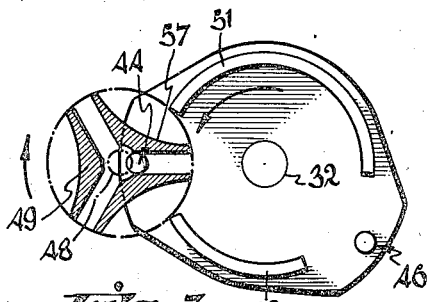
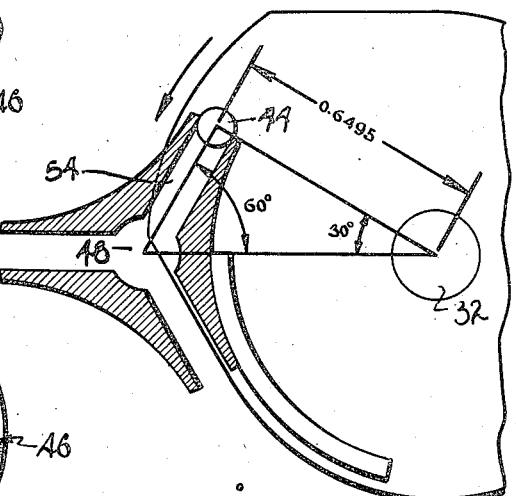
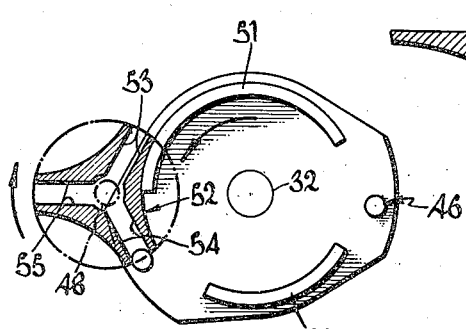
INVENTOR.
PHILIP J. KONKLE
BY
Alden D. Redfield
ATTORNEY.

Patented Feb. 4, 1947

2,415,390

UNITED STATES PATENT OFFICE 2,415,390

INTERMITTENT MOTION DEVICE

Philip J. Konkle, Mount Healthy, Ohio, assignor to The Crosley Corporation, Cincinnati, Ohio, a corporation of Ohio Application September 30, 1941, Serial No. 413,064

9 Claims. (Cl. 178—7.2)

This invention relates to machine elements and mechanisms for producing intermittent motion. The invention has special application to television systems, particularly those designed for 60 frame interlaced scanning where the subject matter to be transmitted is standard moving picture film. With such systems the problem consists in providing a mechanism for scanning the film which according to standard practice is moved intermittently at the rate of 24 frames per second in such a manner as to produce for scanning the 60 frames per second required for the usual television system.

A known method of accomplishing this result is described in U. S. Patent No. 2,082,093, dated June 1, 1937, to Alda V. Bedford, employing an irregularly intermittent drive for the film feed sprocket by means of which alternate views of the subject to be projected are scanned twice in succession and the other views are scanned three times in succession. Such a drive makes it possible to keep the film stationary during the time the light picture is flashed on the cathode ray screen. Since standard motion picture film is projected at the rate of 24 frames per second, the Bedford drive enables 12 frames to be scanned twice, making 24 scannings and the alternate 12 frames to be scanned three times, making 36 scannings, so that for each second a total of 60 scannings may be had. This permits the use of standard 60 cycle alternating current for synchronizing or control purposes.

The Bedford drive utilizes an intermittent cam and spider follower of the "Power" type, which requires substantial modification of standard moving picture projectors in order to adapt them for this system. Attempts have been made to provide a standard projector with a Geneva movement in order to simplify the mechanism by which the film may be pulled down at irregular intervals according to the Bedford method. These involved the use of the common four corner driven element or star wheel disposed in operative relationship with a special driving member having pins or studs spaced 2/5 of 360° or 144° apart. It was found that the angular movement of the driving member required to rotate the driven member 90° (and to pull down one frame) occupied an interval of time longer than that required for scanning a single frame, so that it was not possible to achieve the result of holding the frame stationary during the time an image thereof was projected on the screen.

Accordingly it was not possible to effect proper scanning. In other words the pull down time was too long to enable the required relationship of pull down, projection and scanning to be obtained.

I have found that it is possible to construct an intermittent mechanism involving a simple Geneva movement which will pull down the pictures or frames of a standard film at rates that will permit proper scanning. The achievement of this end constitutes an important object of the present invention.

A further object is to provide a mechanism for the purpose described which is simple, compact and trouble free in operation and which is readily adapted for use with standard moving picture projectors without extensive modification and reconstruction.

A further object is to provide a mechanism by which a rapid and irregularly intermittent motion is secured.

The novel features that I consider characteristic of my invention are set forth in the appended claims; the invention itself, however, both as to its organization and its method of operation together with additional objects and advantages thereof will best be understood from the following description of a specific embodiment when read in conjunction with the accompanying drawings in which:

Figures 2, 3 and 4 are enlarged elevational views showing the mechanism of my invention in three sequential stages of operation.

Figure 6 is a simplified elevational view of the Geneva type intermittent motion device commonly employed in moving picture projectors for standard 35 mm. film; and Figure 7 is an enlarged fragmentary view of a portion of Fig. 2 and shows an analysis of the important dimensions of one specific embodiment of my invention.

Figure 1:
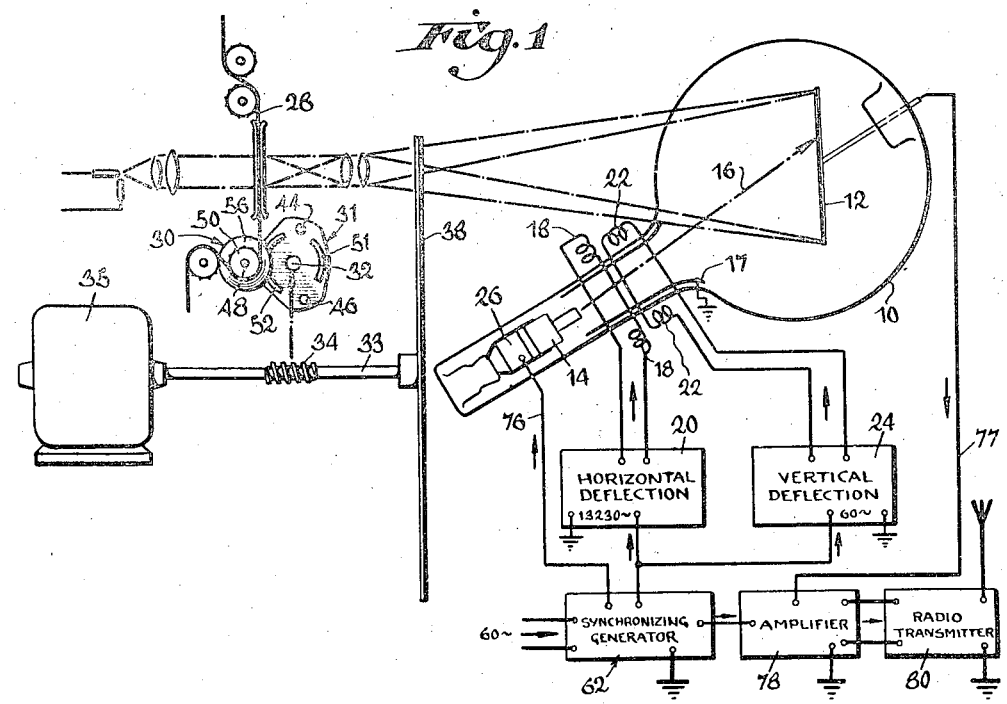
Figure 1 is a simplified diagrammatic view of an illustrative television transmission system similar to that employed by Bedford, in which my invention may be utilized.

With reference to Fig. 1, the reference numeral 10 designates a cathode ray tube for developing picture signals of a type well known in the art. In practice it is preferable to position this tube upside down, it being here shown right side up for the purpose of simplicity. This tube comprises a suitable photosensitive, mosaic screen structure 12 which, for example, may be made up of a great number of minute, photosensitive silver globules supported on a metallic base plate and each insulated from the latter and from each other. A suitable electron gun 14 operates to develop a ray 16 of electrons and to direct the same at the screen structure. The tube is provided with a grounded anode in the form of a silver coating 17 on its inside surface.

The ray 16 is caused to scan the screen structure during predetermined intermittent periods. During the relatively short periods between the intermittent scanning period for each frame, the ray is returned to the initial starting point for scanning the succeeding frame. During each scanning period, the ray scans the screen along a saw-tooth path in a manner well known to the art.

If, for example, scanning proceeds at the rate of 60 pictures or frames a second, each frame having 220½ lines horizontally, the horizontal lines of the odd frames being intermeshed with or falling between those of the even frames, the ray may be deflected horizontally as by coils 18 through which a saw-tooth current wave is caused to pass at a frequency of 13,230 cycles. A suitable generator 20 supplies the current wave for this purpose. Also, the ray may be deflected vertically as by coils 22 through which a sawtooth current wave is caused to pass at a frequency of 60 cycles. A suitable generator 24 supplies the 60-cycle current wave for this purpose.

The electron gun 14 is provided with a control electrode or grid 26 by which the intensity of the ray is varied in the manner and for the purpose hereinafter explained.

The object for transmission is, in the instance illustrated, a standard 35 mm. motion picture film 28 moved intermittently, at the rate of 24 pictures a second, by an intermittent feed device 30. The camshaft 32 of the driving member of this device is driven directly from the shaft 33 of a motor 35. The shaft 33 rotates uniformly at the rate of 30 revolutions per second, and the driving connection 34 to the camshaft 32 is of any suitable type having a drive ratio of 2½ to 1. The camshaft 32, therefore, makes twelve complete revolutions each second.

A shutter disc 38 is fixed on the motor shaft and is provided with two diametrically opposite openings, each of which, at its widest point, extends along one-twentieth of the circumference. The individual pictures of the film are projected onto the screen structure 12 through these openings at the rate of two pictures or frames for each revolution of disc 38.

An intermittent device 30 according to the present invention comprises simple Geneva type of movement consisting of a pair of cooperating members 31 and 49 the relationship of which throughout part of a cycle is shown in Figs. 2, 3 and 4. Member 49 is on the other side of plate 56 in Fig. 1 and for this reason does not appear in this figure.

Member 31 is a driving member and comprises a flanged part 36 keyed or otherwise mounted on shaft 32, which derives its motion through a worm and gear arrangement such as is shown diagrammatically at 34 in Fig. 1. As shown more particularly in Figs. 2-4 inclusive, there are two studs 44 and 46, spaced 144° apart on the flanged part 36 of member 31. Each of these studs is effective, through the instrumentalities hereinafter to be described, to rotate shaft 48 of a driven member 49 through an angle of 120 degrees. Spaced intermediate the studs 44 and 46 and equidistantly from shaft 32 adjacent the periphery of flange 36 are guide elements 51 and 52 which lock shaft 48 in position.

Member 49 is a driven member formed as shown in the figures and has three internal guideways 53, 54 and 55. Driven member 49 may be secured to a supporting plate 56, and it has external guide surfaces 57 formed on the same radius as guide elements 51 and 52 of driving member 31, and adapted to cooperate therewith.

The guideways 53, 54 and 55 are spaced 120° apart. Shaft 48 supports plate 56 and also carries a film driving sprocket 59, which is provided with two rows of 12 teeth adapted to intermesh with perforations in, for example, 35 mm. film, so that rotation of the sprocket one third of a revolution will be effective to advance the film 28 one frame.

In Fig. 2, the stud 44 is about to enter slot 54 to impart clockwise movement to the shaft 48 upon which the pull-down sprocket 59 is mounted. As the shaft 32 continues to rotate, the interaction of stud 44 and slot 54 causes the shaft 48 to rotate through the position shown in Fig. 3, for an angular rotation of 120 degrees to the position shown in Fig. 4. In the beginning and end positions the shaft 48 is locked against rotation by the interaction of surfaces 52 and 51 with 57. When shaft 32 has rotated to a position where stud 46 engages the sides of slot 53, another pull-down operation is begun and the above described action repeated.

It will be noted that the axis of the stud 44 is angularly displaced less than one-hundred and eighty degrees from the axis of the stud 46, the actual displacement being one-hundred and forty-four degrees, as shown. Considering the action for each complete revolution of the shaft 32, and with reference to the time chart shown in Fig. 5, the pictures moved into position by the stud 44 are stationary during the period BC, during which three flashes occur while the pictures moved into position by the stud 46 are stationary during the period DE, during which two flashes occur.

The drive ratio of 2½ to 1 between the shafts 32 and 33 provides that for every 30 revolutions of the shutter disc 38, the shaft 32 will be rotated 12 times and the shaft 48 of the film-driving sprocket 59 will be rotated through 120 degrees twenty-four times. This rotation imparts an irregularly intermittent movement to the film 28, but at the average rate of 24 pictures per second.

Figure 5:
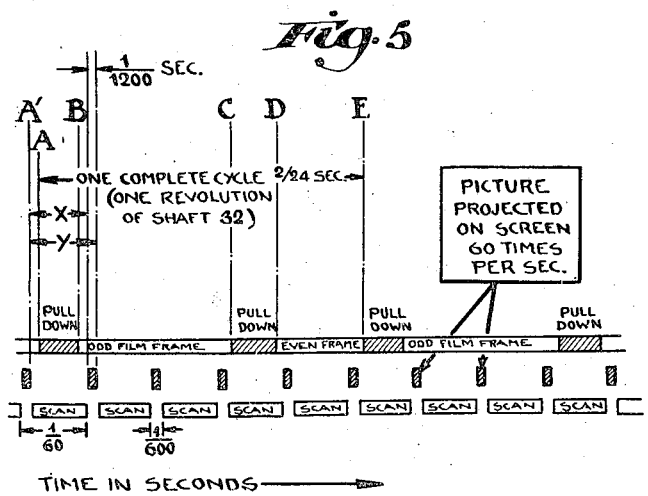
Figure 5 is a chart, illustrative of the sequence of operations employed in television systems of the type described.

The disposition of the shutter openings and the fixed adjustment between the shafts 32 and 33 are such that the relatively short periods, during which pictures are flashed onto the screen 12, occur during the periods when the pictures are stationary. This is represented in Fig. 5. With the disc 38 rotating at the rate of 30 revolutions a second, therefore, images of the individual film pictures are flashed on to the screen 12 at the constant rate of sixty frames a second. Also, on account of the characteristic construction of the intermittent device 30 and the timing, as explained, there will be three images of each of the odd film frames flashed onto the screen in succession, and two images of each of the even film frames flashed onto the screen in succession.

It is to be understood that other arrangements of the disc 38 in Fig. 1 may be useful and in some cases preferable. I have found that this disc may be provided with but one aperture of proper proportions and be so driven from motor shaft 33 as to rotate 60 times per second. Shaft 32 will then rotate at one-fifth of the speed of disc 38. Such an arrangement eliminates the necessity of providing disc 38 with two equal apertures spaced exactly 180 degrees apart.

My invention resides particularly in the construction and arrangement of the intermittent motion device 30. It is common practice in motion picture projectors to provide an intermittent motion device of the type known as a Geneva movement, such as is shown in Fig. 6 in which the driving member 30a is mounted on the shaft 32a and is provided with a single stud 44a for successively engaging each of the four slots of the driven member 49a which is mounted on the shaft 48a. The interaction of members 30a and 49a is similar to that described for my device as illustrated in Figs. 2, 3 and 4. However with this usual arrangement the driving member 30a rotates through an angle of 90 degrees in accomplishing each of the successive movements of the driven member 49a. Attempts have been made to use this Geneva movement for obtaining the irregular intermittent motion required for the television system described herein. In such attempts the driving member 30a was provided with a second stud 46Z spaced angularly from the first by arcs of 144 and 216 degrees to obtain the required 3–2 scanning of successive frames. However with this arrangement it is found that the 90 degree movement of the driving member occupies an interval of time longer than that required for scanning a single frame of the television projection. It is usual to make the interval X, Fig. 5, equal to 90 per cent of the interval Y, or about 63.8 degrees. With the construction just described therefore the motion of the film which begins at the position indicated by A', Fig. 5, will continue for 90 degrees or well past positions at which the period X terminates and the film will not be at rest during the interval Y—X as is required.

I have discovered that if the driven member is constructed with three arms or slots as shown and described instead of four and the diameters of the driving and the driven members are adjusted for proper cooperation that the angle of rotation of the driving member for each successive movement of the driven member is approximately 60 degrees which is well within the limit of 63.8 degrees mentioned above. A standard motion picture projector may be readily changed to embody my invention. The distance between the centers of the driving and the driven members, which is usually 0.75 inch may be retained and the radius to the center of the driving studs made 0.6495 inch and the radius to the ends of the slots on the driven member made 0.375 inch, thus making the ratio of these two radii, 0.577 or the tangent of 30 degrees as is required. These relations are shown in Fig. 7, where 32 is the shaft of the driving member and 48 the shaft of the driven member and 44 is one of the driving studs in the position where it is just entering the end of the slot 54. It should be noted that for proper operation the studs 44 and 46 must lie on radii tangent to the circle described by the outermost part of slots 53, 54, 55. For instance in Fig. 2 the angle between the center line of the slot 54 and a radial line drawn through shaft 32 and stud 44, must be 90 degrees.

For the purpose of developing the saw-tooth current waves for coils 18 and 22, Fig. 1, methods well known in the art are employed. The synchronizing generator 62 may be tied in to the frequency of the power supply so that the synchronizing pulses will be in step with the operation of the motor driven shutter 38 and intermittent motion device 30. It is desirable to provide a synchronous motor 35 designed so that it will always pull into synchronism when its rotor is in a fixed position with respect to one phase of the power supply, this phase being the same phase that is used to control the synchronizing generator 62. By one well known method, the 60 cycle line frequency may be multiplied, in generator 62, by the factors 3, 3, 7 and 7 in succession to produce a frequency of 26460 cycles per second. This is then halved to produce the line frequency of 13230 C. P. S. Synchronizing generator 62 performs several functions as indicated in the block diagram of Fig. 1. It supplies the horizontal deflection generator 20 with 13,230 C. P. S. for the horizontal scanning saw-tooth current wave, and generator 24 with 60 C. P. S. for the vertical scanning. It furnishes through connection 76 the blanking pulses to suppress the electron scanning beam during the retrace periods as will be described later. It also supplies amplifier 78 with the impulses which are combined with the video signal supplied through connection 77 to form the composite television modulation signal for radio transmitter 80. Such a signal is described in the Radio Manufacturers Association (RMA) Standard T-111, but it may be made to comply with other standards. Since there are 60 vertical and 13,230 horizontal scanning pulses per second, it is evident that there will be 220½ horizontal lines for each vertical scanning period. The action of scanning currents of these frequencies in the deflection coils 18 and 22 results in the desired interlaced scanning with one complete 441 line horizontal scanning of the picture for every two vertical scanning periods.

It will be understood that in the position shown in Fig. 1, picture signals are only developed as the ray is deflected horizontally from left to right and vertically from top to bottom. During return deflection of the ray from right to left, horizontally, and also during return deflection of the ray vertically, the ray serves no useful purpose in the way of developing picture signals. It is, therefore, desirable to cut off the ray during return deflection thereof in both horizontal and vertical directions, and for this purpose the synchronizing and framing impulses are taken from a suitable stage of the generator 62 and applied by a connection 76 to the control grid 26. The polarity and amplitude of each of these impulses is such as to impart a negative bias to the grid 26 which is effective to cut off the ray so that it will be non-effective with respect to the screen 12 during these periods.

Referring to Fig. 5, it also will be understood that while the picture is projected onto the screen of the cathode ray tube 10, only during the relatively short intervals at which light is flashed on the screen electrostatic charges are stored on the screen, the value of the stored charge at the particular area of the screen being proportional to the value of light intensity at the corresponding elemental area of the picture. As the ray 16 scans the screen during each of the scanning periods the charges previously stored are neutralized to develop the picture signals.

Having described my invention, I claim:

1. In an intermittent motion device of the Geneva movement type, a driven member having three equally spaced radial recesses and a driving member having two actuating members for cooperating with said recesses of the driven member, said members defining arcs of 144 degrees and 216 degrees about their center of rotation.

2. An irregularly intermittent device comprising a pair of shafts, a driven member mounted on one shaft, said member having disposed thereon three radial guideways angularly spaced 120 degrees from each other, and irregularly spaced members mounted on the other shaft for engaging said guideways, the ratio of the radius of the driven member to the radius of the driving member being equal to the tangent of 30 degrees.

3. An irregularly intermittent device comprising a pair of shafts, a driven member mounted on one shaft, said member having disposed therein three radial guideways only, each angularly spaced 120 degrees from each other, and means mounted on the other shaft for engaging said guideways, said means comprising a pair of guideway engaging members angularly spaced 144 degrees apart in one direction and 216° apart in the other direction.

4. In a television system of the type adapted for the projection of moving picture film at the rate of 24 frames per second, and in which images from said film are projected upon the screen of a cathode ray tube for scanning 60 times per second, an irregularly intermittent motion device for driving said film wherein the projected images of alternate frames of said film are scanned twice and the images of the other frames are scanned three times and wherein the motion of said film occurs within a single scanning interval and wherein the driving member of said device is provided with two actuating members arranged for rotation about an axis, the arcs defined by said actuating members being 144 degrees and 216 degrees; a rotatable driven member for said device, said driven member having three recesses equally spaced angularly thereon.

5. In a television system of the type adapted for the projection of moving picture film at the rate of 24 frames per second, and in which images from said film are projected upon the screen of a cathode ray tube for scanning 60 times per second, an irregularly intermittent motion device for driving said film wherein the projected images of alternate frames of said film are scanned twice and the images of the other frames are scanned three times and wherein the motion of said film occurs within a single scanning interval and wherein the driving member of said devices is provided with two actuating members arranged for rotation about an axis, the arcs defined by said actuating members being 144 degrees and 216 degrees; a rotatable driven member for said device, said driven member constituting a three-armed star wheel of the Geneva movement type.

6. In a television system for picture film moving at the rate of 24 frames per second, said system comprising means for scanning images projected from said film upon a screen of a cathode ray tube at the rate of 60 times per second, an irregularly intermittent device comprising a driving member and a driven member, said driving member having stud means angularly spaced 144° and 216° from each other and having arcuate guide means spaced between said stud means, said driven member comprising radial slots interiorly thereof angularly spaced 120° from each other and having arcuate external guide surfaces whereby said surfaces coact with said arcuate guide means on said driving member thereby locking the driven member after said stud means have rotated the same by engaging said slots.

7. In a television system for transmitting moving picture film scanning means for developing picture signals and means for moving said film intermittently into position for scanning each picture frame, said means comprising a driving member and a driven member, said driving member having stud means angularly spaced 144° and 216° from each other and having arcuate guide means spaced between said stud means, said driven member comprising radial slots interiorly thereof angularly spaced 120° from each other and having arcuate external guide surfaces whereby said surfaces coact with said arcuate guide means on said driving member thereby locking the driven member after said stud means have rotated the same by engaging said slots.

8. In a television system for transmitting moving picture film scanning means for developing picture signals and means for moving film intermittently into position for scanning each picture frame, said means comprising a driven member mounted on a shaft, said member having disposed therein three radial guideways angularly spaced 120° from each other and irregularly spaced members mounted on the other shaft for engaging said guideways, the ratio of the radius of the driven member to the radius of the driving member being equal to the tangent of 30°.

9. In a television system for transmitting moving picture film scanning means for developing picture signals and means for moving film intermittently into position for scanning each picture frame, said means comprising a driven member having three equally spaced radial recesses and a driving member having two actuating members for cooperating with said recesses of the driven member, said actuating members defining arcs of 144° and 216° about their center of rotation.

PHILIP J. KONKLE.

REFERENCES CITED

The following references are of record in the file of this patent:

UNITED STATES PATENTS

| Number | Name | Date |
|---|---|---|
| 1,983,570 | Schmitt | Dec. 11, 1934 |
| 719,198 | Cyr | Jan. 27, 1903 |
| 1,198,683 | Victor | Sept. 19, 1916 |
| 2,011,352 | Capstaff | Aug. 13, 1935 |
| 2,011,353 | Capstaff | Aug. 13, 1935 |
| 2,082,093 | Bedford | June 1, 1937 |
| 2,165,778 | Beers | July 11, 1939 |
| 2,192,121 | Bedford | Feb. 27, 1940 |
| 2,225,033 | Condliffe | Dec. 17, 1940 |
| 2,250,479 | Goldmark | July 29, 1941 |
| 2,254,614 | Mattke | Sept. 2, 1941 |